UNITED STATES PATENT OFFICE.

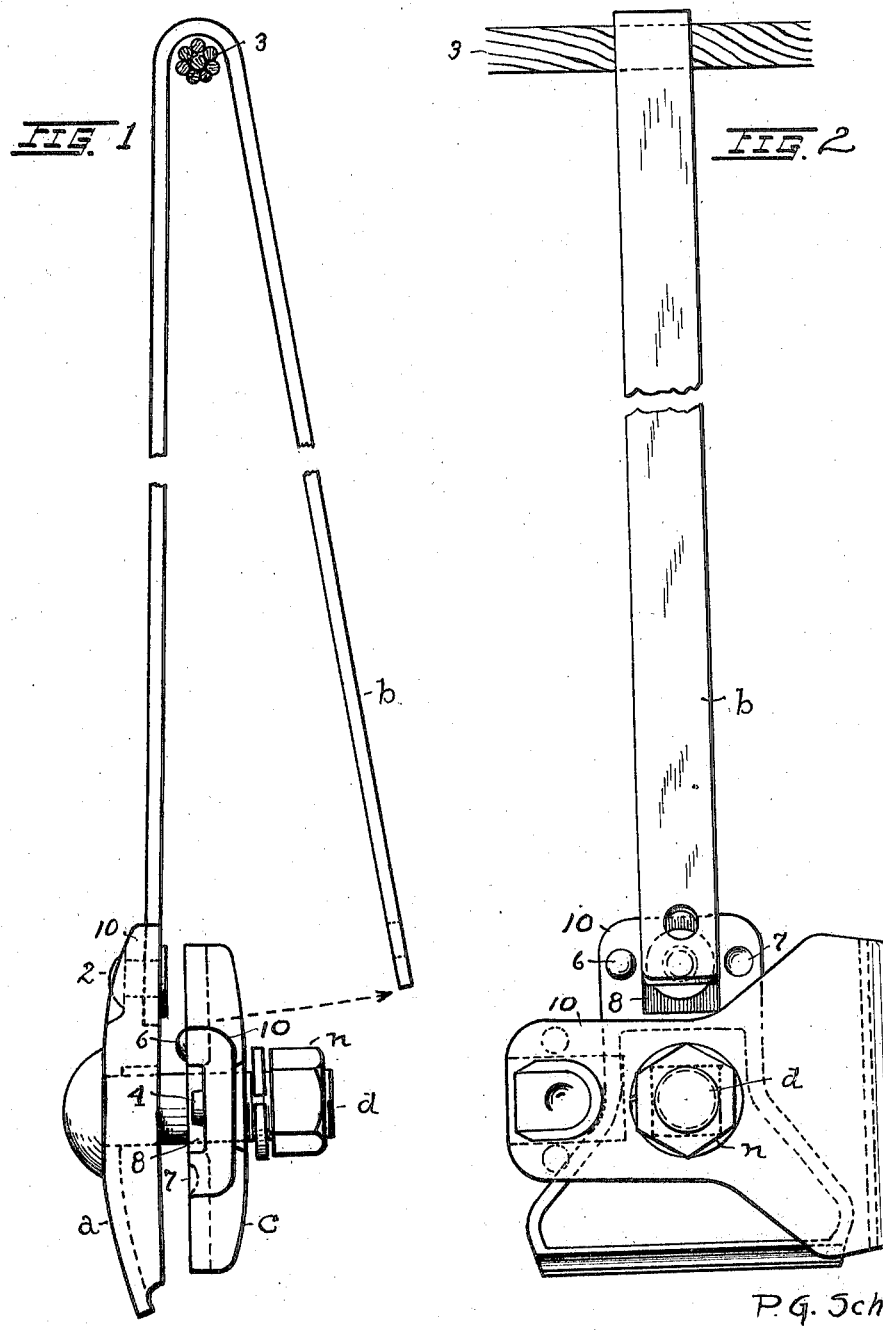

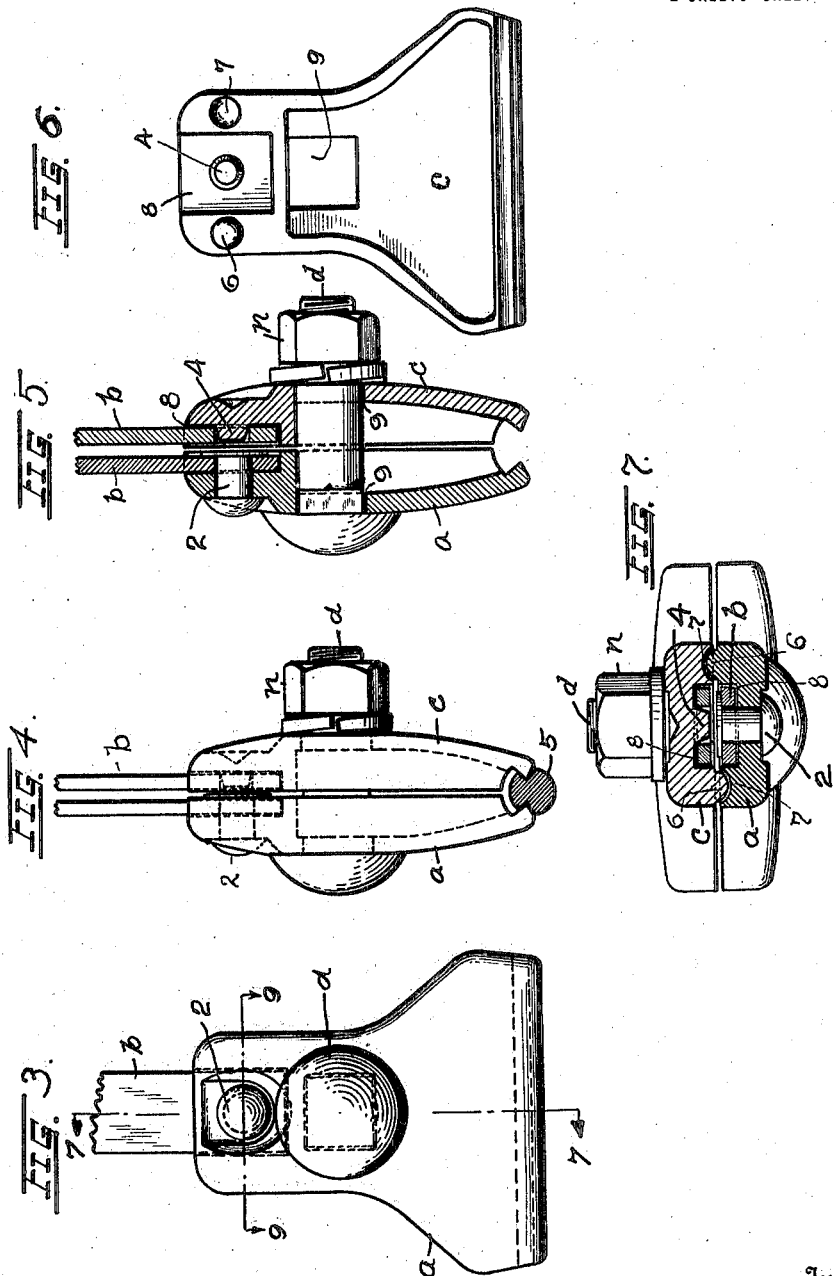

PAUL G. SCHWARZ, OF INDIANAPOLIS, INDIANA, ASSIGNOR TO DREW ELECTRIC AND MANUFACTURING COMPANY, OF INDIANAPOLIS, INDIANA, A CORPORATION.

CATENARY TROLLEY-CLAMPING EAR.

1,393,458.

Specification of Letters Patent.

Patented Oct. 11, 1921.

Application filed December 22, 1919. Serial No. 346,638.

*To all whom it may concern:*

Be it known that I, PAUL G. SCHWARZ, a citizen of the United States, residing at Indianapolis, in the county of Marion and State of Indiana, have invented certain new and useful Improvements in Catenary Trolley-Clamping Ears, of which the following is a specification.

This invention consists in a catenary clamping ear or hanger for overhead trolley wires and the object is to provide a pair of rotatably-related clamping members which are particularly constructed to clamp and hold a trolley wire and facilitate connection with and disconnection from a cable, substantially as herein described and more particularly pointed out in the claims.

In the accompanying drawings, Figure 1 is an edge elevation of the complete device in an open position upon a cable with one clamping member turned at right angles to the other. Fig. 2 is a side view of the device with the parts in the same position as shown in Fig. 1. Fig. 3 is a side elevation of the clamp closed and Fig. 4 an edge elevation thereof with a section of a trolley wire clamped therein. Fig. 5 is a sectional view on vertical line 7—7, Fig. 3 and Fig. 6 is an inside view of one of the clamping members. Fig. 7 is a cross section in plan on line 9—9, Fig. 3.

The ear or hanger as thus disclosed comprises two clamping members $a$ and $c$, a suspensory $\frac{5}{8}''$ flat strap $b$ and a clamping bolt $d$, and the said parts are so constructed and arranged that the clamping members may be separated and rotated to install or remove the device from its suspending cable or to unclamp the trolley wire without removing the bolt or its nut $n$. In a broad sense a suspensory member of this general type adapted to be engaged or disengaged with respect to the cable without removing the bolt is not claimed to be broadly new, for I am aware of hangers having been made which used $\frac{1}{4}''$ round rods for this purpose instead of flat straps, as in this instance, but such rods have always been difficult to fasten upon or in the clamps and to locate under the clamping bolt and have not been found satisfactory in general experience.

In the present instance I use a flat flexible metallic strap $b$ and two rotatable clamping members, one leg or end of the strap being fixed to one member and the other leg or strap being detachably engaged with the other member.

Structurally, the strap is provided with round holes oppositely in its ends, and one end is permanently secured to the clamping member $a$ by a rivet 2 engaged through a corresponding hole in the said member and having its inner end flattened or upset against the strap, or by equivalent means. This leaves the other end of the strap free, and the strap being of spring metal with a U-bend to engage over the cable 3, the said free end, seen in Fig. 2, is adapted to have the cable passed in between the same and clamping member $c$ and then down and around said end into the strap, and said member $c$ has a locating boss or lug 4 on its inside opposite the rivet 2 on which said free end is engaged by the hole therein. The tightening of the screw $d$ then clamps the said parts together firmly and upon the channeled trolley wire 5 at the bottom. Registering bosses 6 and opposite cavities 7 are formed on the inner sides of the said clamping members which determine their assembled relations, and said members also have angular recesses 8 oppositely between said bosses 6 and cavities 7 of a size and shape to seat the ends of the strap somewhat snugly therein, and the rivet 2 and boss 4 are centrally positioned in these recesses respectively.

Both clamping members also have square holes 9 to receive the locking bolt, and at least a portion of the shank of said bolt is square or angular to occupy said holes and prevent turning of the bolt when the nut $n$ is turned. By making square holes in both said members alike, the bolt $d$ can be inserted from either side according to convenience in assembling the parts.

The hanger strap in fact is positively engaged with or upon the clamping members as well as between them by reason of the angular recesses 8 and the rivet 2 which makes a permanent rigid attachment of one end, and the locating lug or boss 4 integral with the member $c$ and supporting the other end of the strap apart from the side support it receives when the sides of the ear are clamped together.

The clamping members $a$ and $c$ are of the same size and shape, and the openings 9 are centrally situated therein at the base of the narrow elongated and recessed strap holding portions 10, so that when member is turned on the bolt and placed at right angles to the other member the free end of strap *b* may be freely moved toward or away from the riveted end of the strap, thereby permitting the device to be slipped upon or removed from cable 3 with convenience and despatch and without removing the nut *n* or bolt *d*.

What I claim is:

1. A catenary trolley clamping device, comprising a flat flexible strap bent midway its length, a wire clamping member riveted to one end of said strap, and a separate rotatable wire clamping member having an integral projection detachably engaged with the other end of said strap, and a bolt binding said clamping members together.

2. A trolley-wire clamping hanger having two wire clamping members each provided with an angular recess, a strap having its ends seated in said recesses, means affixing one of said ends permanently in one of said recesses, and means detachably engaging the other end in the other recess, and a bolt clamping said members and the said strap ends facially together, said members being rotatably related on the bolt.

3. A trolley-wire hanger comprising two wire clamping members having opposite recesses centrally at their top, a flat metallic strap having its ends provided with holes and seated in said recesses and an integral boss in one of said recesses on one member engaged in one of said holes and a rivet through the other recess securing the end of the strap therein, and means to draw said members together.

4. A catenary trolley-wire hanger, comprising a pair of wire clamping members, a suspensory strap fixed permanently at one end to one of said members and detachably engaged at its opposite end with the other member, the latter member being narrowed at its strap engaging end and rotatably connected in clamping union with the other member.

5. A catenary trolley-wire hanger, comprising a pair of wire clamping members having narrowed recessed ends, a bent strap having one end inserted and permanently secured in the recessed end of one of said members and its opposite end removably seated and detachably connected within the recessed end of the other member, and a clamping bolt adapting rotation of one of said members relatively to the other to permit a lateral movement of said strap and detachment therefrom without removing the bolt from either member, or detaching the fixed member from the strap.

6. A trolley-wire clamping hanger, comprising a pair of clamping members recessed and narrowed at their upper ends and provided with registering openings centrally, a bent strap having one end permanently and rigidly affixed within the recessed end of one of said members and its opposite end perforated and detachably connected with a lug within the recessed end of the other member, a bolt extending through the central openings of said members, and a nut engaged with said bolt at the side of one of said members.

Signed at Indianapolis, in the county of Marion, and State of Indiana, this 18th day of November, 1919.

PAUL G. SCHWARZ.